United States Patent
Lu

(10) Patent No.: US 6,694,768 B2
(45) Date of Patent: Feb. 24, 2004

(54) NON-FROST DEEP-FREEZING GAS DEHYDRATOR

(76) Inventor: Yingzhong Lu, 104 Harland Ct., Oak Ridge, TN (US) 37830

( * ) Notice: Subject to any disclaimer, the term of this patent is extended or adjusted under 35 U.S.C. 154(b) by 50 days.

(21) Appl. No.: 09/683,925

(22) Filed: Mar. 4, 2002

(65) Prior Publication Data

US 2003/0033827 A1 Feb. 20, 2003

(51) Int. Cl.[7] .............................................. F25D 17/04
(52) U.S. Cl. ................... 62/317; 62/85; 62/93
(58) Field of Search ............... 62/80, 85, 93, 62/317, 620; 96/234, 242

(56) References Cited

U.S. PATENT DOCUMENTS

| 5,006,138 A | * | 4/1991 | Hewitt | 62/18 |
| 5,664,426 A | * | 9/1997 | Lu | 62/93 |
| 6,158,242 A | * | 12/2000 | Lu | 62/637 |

* cited by examiner

Primary Examiner—Melvin Jones

(57) ABSTRACT

The present invention related to a refrigeration dehydration apparatus for efficient and cost-effective dehydration of a variety of gases, in particular natural gas to very low dewpoint without solid ice/gas-hydrate deposition. The present invention provides a low-cost dehydration apparatus universally applicable to both terrestrial and off-shore NG exploitation.

14 Claims, 4 Drawing Sheets

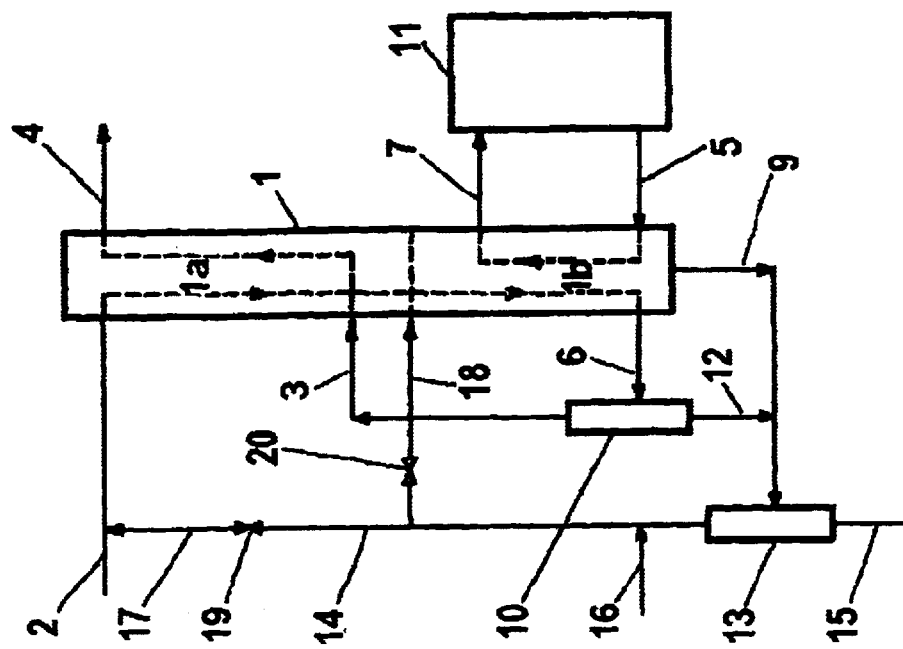
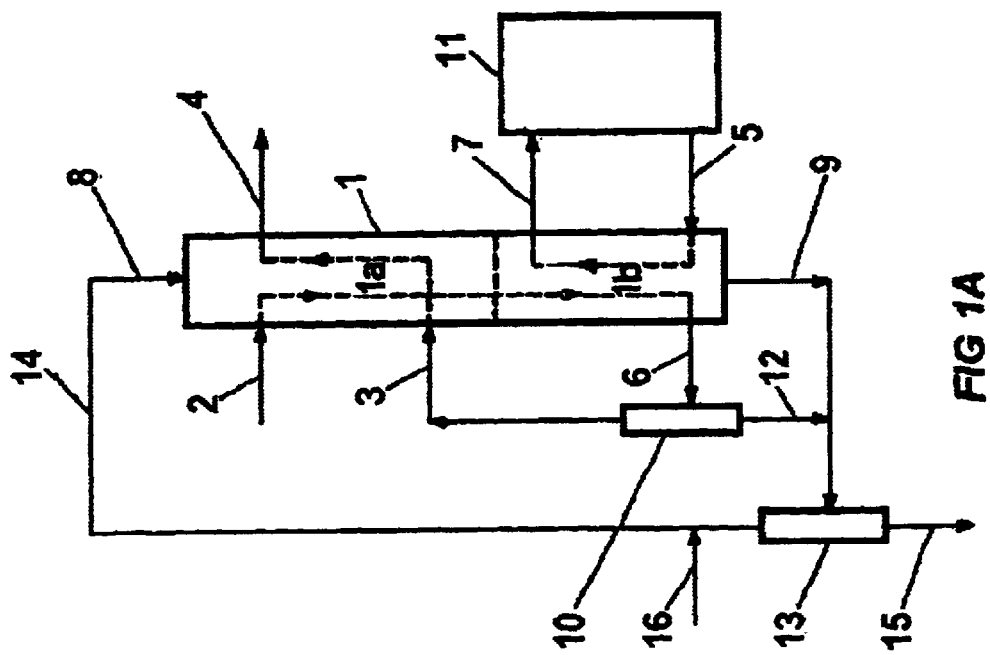

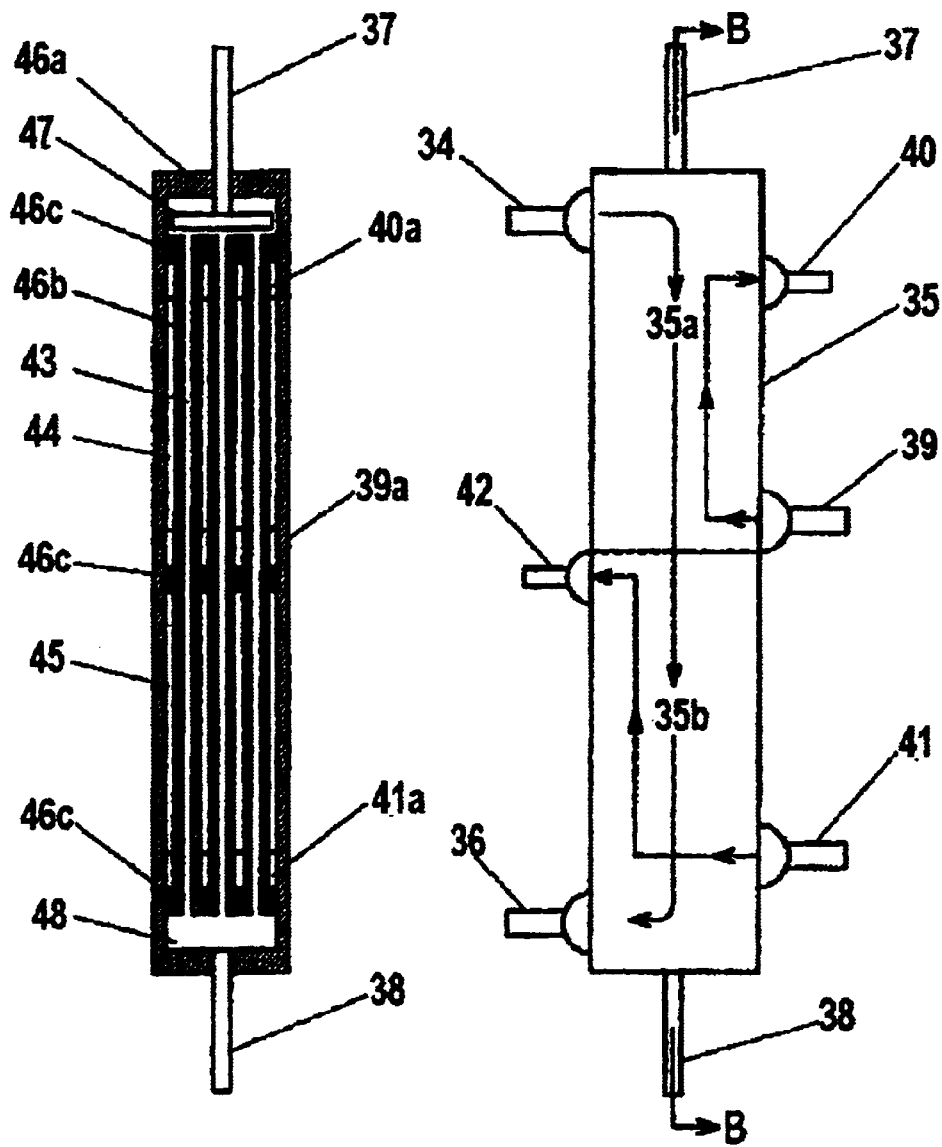

NON-FROST DEEP-FREEZING GAS DEHYDRATOR

BACKGROUND OF INVENTION

The reduction of $CO_2$ emission is one of the greatest concerns in combating the catastrophic "global warming" trend. As a result, the world puts much emphasis on the exploitation of "clean energy" with less or non-$CO_2$ emission for both industrial and domestic uses. Natural gas (hereafter abbreviated as "NG"), as compared with coal and petroleum, is considered the most economic "clean" fuel that could be used on a large, industrial scale at present and in the near future. In addition, the discovery of huge amount of ocean-bed gas-hydrate deposits substantially increases the recoverable NG resources. It is expected that, in the long run, the global NG consumption may eventually exceeds all other fossil fuels.

Dehydration is required for the exploitation, transportation, and processing of NG. The state-of-the-art technologies for NG dehydration include glycol absorption and molecular sieve adsorption. The glycol dehydrator is less expensive and widely used for moderate dewpoint reduction. The harmful emission of the BTEX (i.e., benzene, toluene, ethyl benzene, and xylene) from glycol dehydrators is the major environmental concern about this technology. The molecular sieve dehydrator is more expensive. Its application is limited to where higher dewpoint reduction is required. In addition, the larger size and weight of the molecular sieve dehydrator hinder its application to the off-shore platforms. An environmental-benign, compact, and economical dehydration technology, therefore, is desired to better serve the ever-booming NG industry.

Refrigeration dehydration technology, as a potential alternative to the above-mentioned dehydration technologies, has already been widely used for air dehumidification and compressed air dehydration. For NG dehydration, the major drawback is the clogging caused by solid ice/gas-hydrate depositions in the refrigeration dehydrator. More recently, technically breakthrough was proposed in both U.S. Pat. No. 5,664,426 "Regenerative Gas Dehydrator" (1997) and U.S. Pat. No. 6,158,242 "Gas Dehydration Methodology and Apparatus" (2000). Following a successful field test of a refrigeration NG dehydrator prototype at a gas well in Texas (2000), active commercialization efforts on refrigeration NG dehydrator have been pursued both in the United States and in the PRC.

The current refrigeration dehydrator for NG operates on an alterative freezing-thawing cycle to eliminate the clogging of the solid ice/gas hydrate deposits in the flow channels and pipelines. Several identical moisture removal units have to be installed to allow such alternative operations. As a consequence, the size and cost of current refrigeration NG dehydrator could not be reduced to meet the requirements of a diversified market, in particular the off-shore and remote NG sites where a more compact equipment is required. A further breakthrough, therefore, in the refrigeration dehydration technology is desired.

Accordingly, it is an objective of the present invention to provide a non-frost deep-freezing refrigeration dehydrator wherein no solid ice/gas-hydrate depositions appear even at very low dewpoint. Alternative freezing-thawing operations are no longer required. Continuous operations are feasible with a single dehydration unit.

Another objective of the present invention is to provide a compact and light-weighted NG dehydrator for the applications to off-shore and remote NG sites.

Still another objective of the present invention is to provide an energy-saving refrigeration dehydrator that utilizes the expansion of the high-pressure NG to provide the required refrigeration.

A further objective of the present invention is to provide a high-efficiency free-piston expander-compressor to provide the required refrigeration.

SUMMARY OF INVENTION

With regard to the above and other objectives, the present invention provides a non-frost deep-freezing refrigeration dehydrator wherein no solid ice/gas-hydrate depositions appear even at very low dewpoint. Alternative freezing-thawing operations are no longer required. Continuous operations are feasible with a single dehydration unit.

The said apparatus consists of the following major components: a moisture-trap, i.e., a special heat exchanger comprising an upper pre-cooling section (hereafter abbreviated as "pre-cooler") and a deep-cooling section (hereafter abbreviated as "deep-cooler"); a gas-liquid separator; an inhibitor regenerator; and a refrigeration unit.

The principle of the operations of the non-frost deep-freezing refrigeration dehydrator follows. The application of the present invention to NG dehydration will be used as an example in the following descriptions, wherever appropriate.

The inlet moisture-laden NG enters of the moisture trap from the top of the primary side of the pre-cooler and flows downward all the way into the deep-cooler. The said inlet NG is first pre-cooled by the cold dehydrated NG reflux flowing upward through the secondary side of the pre-cooler, and then deep-cooled by the refrigerant (or brine) flowing through the secondary side of the deep-cooler. As the temperature of the inlet NG drops along its flow path, the moisture condenses on the surface of the flow channels, which is covered with a down-flowing liquid film of a gas-hydrate inhibitor (hereafter abbreviated as "inhibitor") solution. The concentration of the inhibitor in the solution should be sufficiently high so that no solid deposit would appear in the liquid film all the way down to the NG outlet of the moisture trap. The dehydrated NG with desired dewpoint eventually exits from the bottom of the moisture trap.

The deep-cooled NG then enters a gas-liquid separator to clean up the entrained liquid droplets, if any. The fully dehydrated cold NG is recycled as a reflux coolant to the secondary side of the pre-heater.

The used inhibitor solution, diluted with the condensates, is sent to an inhibitor regenerator to be recovered as an enriched inhibitor solution. The latter is recycled. The produced wastewater is discharged.

The refrigeration unit provides the required refrigeration for the deep-cooler. In general, a separate industrial refrigerator could be used for this purpose. When the pressure of the inlet NG is sufficient high, the required refrigeration could be provided with expanding the dehydrated cold NG, preferably in a NG expander-compressor to recover a portion of the expansion energy. In such a "self-refrigeration" unit, no external energy is required for refrigeration.

In case that the pressure difference between the inlet NG and the NG transportation pipeline is small, a high-efficiency free-piston NG expander-compressor is proposed in the present invention to provide the self-refrigeration.

BRIEF DESCRIPTION OF DRAWINGS

The above and other features and advantages of the present invention will now be further described in the following detailed description section in conjunction with the attached drawings in which:

FIGS. 1A&B illustrate one preferred embodiment of the non-frost deep-freezing refrigeration dehydrator of the present invention, wherein a separate industrial refrigerator is incorporated to provide the required refrigeration. In FIG. 1A the inhibitor is introduced as an aqueous solution, and in FIG. 1B the inhibitor is introduced as a gas.

In FIG. 2A the NG expander-compressor stands alone as a self-refrigeration unit and replaces the separate industrial refrigerator in FIG. 1B.

FIG. 3 illustrates one preferred embodiment of the moisture trap of the present invention wherein an integrated multi-flow finned plate heat exchanger is used.

FIG. 4 illustrates a cross-section of the moisture trap in FIG. 3.

DETAILED DESCRIPTION

Figure 2B:
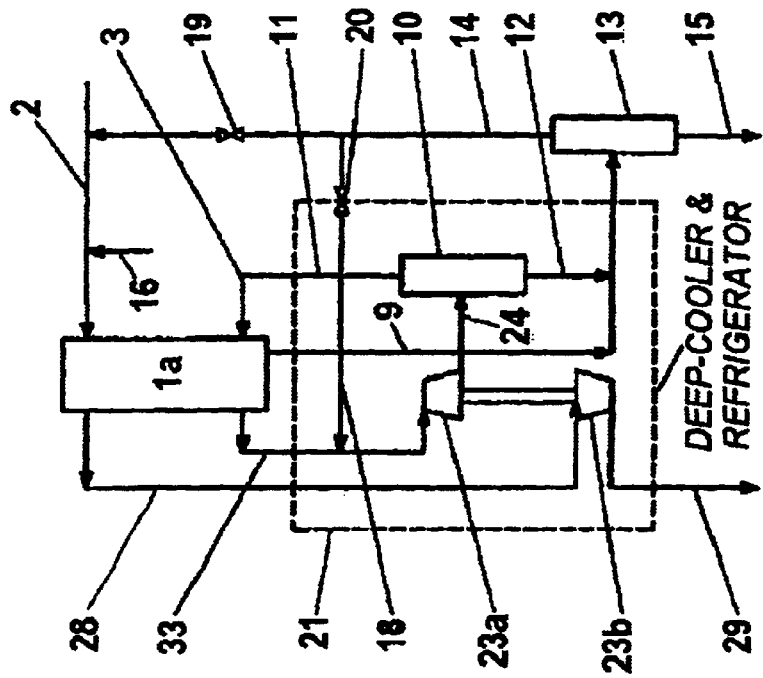
In FIG. 2B the NG expander-compressor is integrated with the moisture trap and replaces both the deep-cooler and the industrial refrigerator in FIG. 1B.

FIGS. 1A&B illustrate one preferred embodiment of the non-frost deep-freezing refrigeration dehydrator of the present invention, wherein a separate industrial refrigerator is incorporated to provide the required refrigeration. In FIG. 1A the inhibitor is introduced as an aqueous solution, and in FIG. 1B the inhibitor is introduced as a gas.

In FIG. 1A, the said apparatus consists of the following major components: a moisture-trap 1 comprising a pre-cooler 1a and a deep-cooler 1b; a gas-liquid separator 10; an inhibitor regenerator 13; and an industrial refrigerator 11.

The principle of the operations of the non-frost deep-freezing refrigeration dehydrator follows. The inlet moisture-laden NG enters the top of the primary side of the pre-cooler 1a via the NG inlet pipeline 2. The said inlet NG flows downward and is pre-cooled by the cold dehydrated NG reflux flowing upward through the secondary side of the pre-cooler. As the temperature of the inlet NG drops along its flow path, the moisture condenses on the surface of the NG flow channels which is covered with a down-flowing liquid film of an inhibitor solution introduced via the inhibitor inlet pipeline 8. The inhibitor prevents the condensates from forming gas-hydrates and/or frozen into ice.

The pre-cooled NG continues to flow downward into the primary side of the deep-cooler 1b, and the NG is deep-cooled by the refrigerant (or brine) flowing in the secondary side of the deep-cooler. The refrigerant enters the deep-cooler via the refrigerant inlet pipeline 5 and exits via the refrigerant outlet pipeline 7. The refrigerant is provided with a separate industrial refrigerator 11. The down-flowing liquid film of an inhibitor solution on the flow channel surface prevents the condensates from forming gas-hydrate and/or frozen into ice. The concentration of the inhibitor in the solution should be kept sufficiently high so that no solid deposits would appear along the entire flow path of the inlet NG.

The NG is cooled to the desired dewpoint temperature in the moisture trap, and exits from the bottom of the deep-cooler 1b. The dehydrated NG then enters the liquid-gas separator 10 via the NG transfer pipeline 6. The liquid droplets entrained in the NG stream are separated as an effluent containing the diluted inhibitor solution. The liquid-free dehydrated NG is recycled as a reflux into the pre-cooler via the reflux transfer pipeline 3 and exits from the pr-cooler via the dehydrated NG outlet pipeline 4. The effluent is discharged via the effluent discharge pipeline 12, and joins the other stream of diluted inhibitor solution discharged from the bottom of the deep-cooler via the inhibitor outlet pipeline 9. The joint diluted inhibitor solution stream enters the inhibitor regenerator 13, wherein the diluted inhibitor solution is concentrated and recycled into the pre-cooler via the inhibitor recycle pipeline 14. The separated wastewater is discharged via the wastewater discharge pipeline 15. The makeup inhibitor solution is introduced into the recycle pipeline via the inhibitor makeup pipeline 16.

In FIG. 1B, the configuration of the said apparatus is almost identical with that in FIG. 1A, except that a gaseous inhibitor is injected into the moisture trap instead of an aqueous inhibitor solution. A few differences in the pipeline connections are shown in this figure.

In FIG. 1B, the said apparatus also consists of the following major components: a moisture-trap 1 comprising a pre-cooler 1a and a deep-cooler 1b; a gas-liquid separator 10; an inhibitor regenerator 13; and an industrial refrigerator 11.

The principle of the operations of the dehydrator using a gaseous inhibitor follows. The inlet moisture-laden NG, coming from the NG inlet pipeline 2 and mixed with a gaseous inhibitor introduced via the pipeline 17, enters from the top of the primary side of the pre-cooler 1a. The said inlet NG flows downward and is pre-cooled by the cold dehydrated NG reflux flowing upward through the secondary side of the pre-cooler. As the temperature of the inlet NG drops along its flow path, the moisture condenses on the surface of the NG flow channels, while the inhibitor gas dissolves into the condensate and forms a down-flowing liquid film of inhibitor solution on the said surface. The inhibitor prevents the condensates from forming gas-hydrate and/or frozen into ice.

Before entering the deep-cooler, the pre-cooled NG mixes with more inhibitor gas introduced via the inhibitor bypass pipeline 18. The inhibitor laden NG then flows downward into the deep-cooler 1b, and is deep-cooled by the refrigerant (or brine) entering the secondary side of the deep-cooler via the refrigerant inlet pipeline 5 and exiting via the refrigerant outlet pipeline 7. The refrigerant is provided with a separate industrial refrigerator 11. The inhibitor gas dissolves into the liquid film and prevents the condensates from forming gas-hydrate and/or frozen into ice in the deep-cooler.

The NG is cooled to the desired dewpoint temperature in the moisture trap, and exits from the bottom of the deep-cooler 1b. The dehydrated NG enters the liquid-gas separator 10 via the NG transfer pipeline 6. The liquid droplets entrained in the NG stream are separated as an effluent containing the diluted inhibitor solution. The liquid-free dehydrated NG is recycled as a reflux into the pre-cooler via the reflux transfer pipeline 3 and exits via the dehydrated NG outlet pipeline 4. The effluent is discharged via the effluent discharge pipeline 12, and joins the other stream of diluted inhibitor solution discharged from the bottom of the deep-cooler via the inhibitor outlet pipeline 9. The joint inhibitor solution stream enters the inhibitor regenerator 13, wherein the inhibitor gas is evaporated and recycled into the pre-cooler via the inhibitor recycle pipeline 14, and the separated wastewater is discharged via the wastewater discharge pipeline 15. The makeup inhibitor gas is introduced into the system via the inhibitor makeup pipeline 16. The inhibitor gas stream in inhibitor recycle pipeline is divided into two streams, as appropriate, with the distribution valves 19 and 20. A portion of the inhibitor gas is introduced into the inlet NG via the inhibitor supply pipeline 17, and the balance is introduced into the space between the pre-cooler and the deep-cooler via the inhibitor bypass pipeline 18.

It should be pointed out that, for the dehydration of very high pressure and low temperature NG, it may be more economic to discharge the diluted inhibitor solution without regeneration and recycle. In this case, the inhibitor regenerator 13 might be eliminated.

Figure 2A:
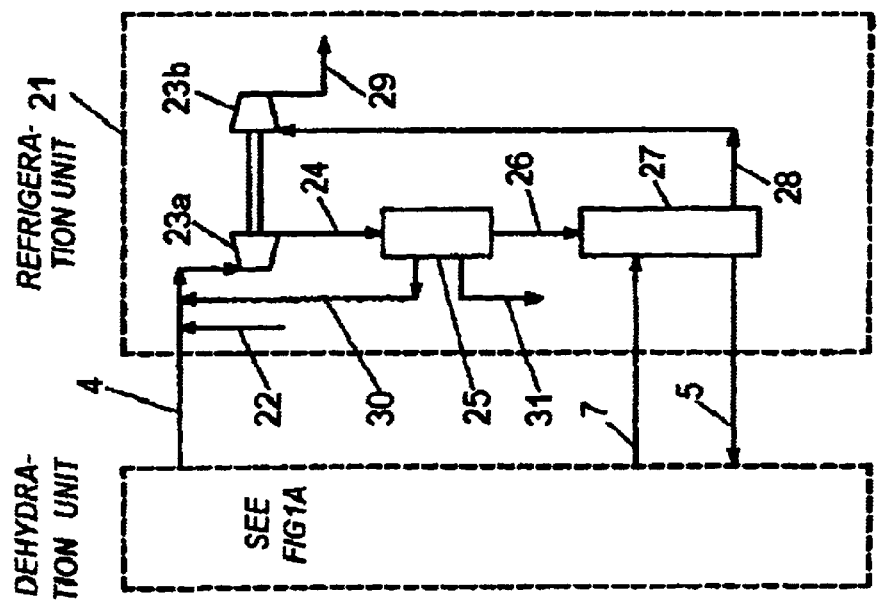
FIGS. 2A&B illustrate another preferred embodiment of the of the non-frost deep-freezing refrigeration dehydrator of the present invention, wherein a self-refrigeration unit is incorporated to provide the required refrigeration. In both cases the inhibitor is introduced as a gas.

FIGS. 2A&B illustrate another preferred embodiment of the of the non-frost deep-freezing refrigeration dehydrator of the present invention, wherein a self-refrigeration unit (as shown with a dotted line block 21) is incorporated to provide the required refrigeration. In both cases the inhibitor is introduced as a gas. In FIG. 2A the NG expander-compressor stands alone as a self-refrigeration unit and replaces the separate industrial refrigerator in FIG. 1B. In FIG. 2B the NG expander-compressor is integrated with the moisture trap and replaces both the deep-cooler and the industrial refrigerator.

Figure 6:
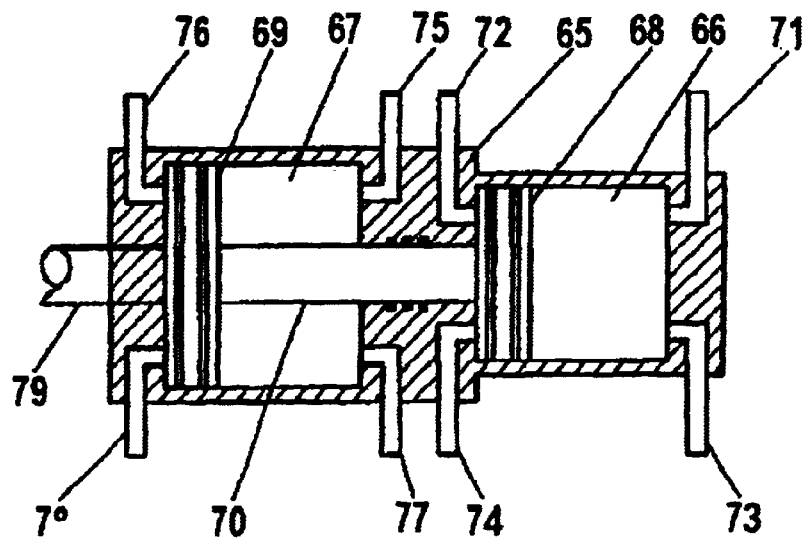
FIG. 6 illustrates the high-efficiency free-piston NG expander-compressor for providing self-refrigeration.

According to the magnitudes of the pressure difference between inlet NG and the dehydrated NG transportation pipeline, there are three options of the NG expansion devices. (1) When the said pressure difference is quite large, a simple expansion valve could be used to expand the NG to above the transportation pipeline pressure and still obtain the desired low temperature for refrigeration. In this case, the de-pressured NG needs no re-compression. (2) When the said pressure difference is moderately high, the NG has to be expanded to below the transportation pipeline pressure to obtain the desired low temperature for refrigeration. A portion of the expansion energy needs to be recovered for re-compression the de-pressurized NG. In this case, a turbo expander-compressor is preferred. (3) When the said pressure difference is rather small, but still relevant, the expansion energy must be recovered to the maximum extent for NG re-compression. In this case, the high efficiency free-piston expander-compressor, as shown in FIG. 6, is recommended.

Return now to FIG. 2A. The only difference between FIG. 2A and FIG. 1B lies in the replacement of the NG expander-compressor for the industrial refrigerator. The dehydration units in both cases are identical, and, hence, in FIG. 2A it is illustrated by a simple black box bounded with dotted lines. Only the refrigeration unit with NG expander-compressor is shown here in details.

The said refrigeration unit comprises the following major components: a co-shaft NG expander 23a and compressor 23b, an inhibitor separator 25, and a heat exchanger 27.

The operations of the refrigeration unit follow. The cold dehydrated NG, coming from the dehydrated NG outlet pipeline 4 and mixed with a gaseous inhibitor from the inhibitor recycle pipeline 30, enters the expander 23a. After expansion, the NG temperature drops significantly. The moisture condensed into tinny liquid droplets. The chilly de-pressurized NG enters the inhibitor separator 25 via the de-pressurized NG transfer pipeline 24. The entrained liquid droplets are separated as an effluent that is processed inside the separator. Inhibitor gas is then evaporated from the effluent and recycled via the inhibitor recycle pipeline 30. The wastewater is discharged via the wastewater pipeline 31. The make-up inhibitor gas is introduced into the un-expanded NG via the inhibitor makeup pipeline 22.

The chilly de-pressurized NG enters the primary side of the heat exchanger 27 via the chilly NG inlet pipeline 26 and exit via the de-pressurized NG outlet pipeline 28. A refrigerant (or brine), entering the secondary side of the heat exchanger 27 from the pipeline 7 is deep-cooled in the heat exchanger and return to the dehydration unit via the pipeline 5.

The dehydrated NG eventually leaves the heat exchanger 27 via the de-pressurized NG outlet pipeline 28 and enters the compressor 23B. The NG is re-compressed to the required pressure and delivered via the dehydrated NG outlet pipeline 29 to the NG transportation pipeline (not shown).

FIG. 2B illustrates another embodiment wherein the NG expander-compressor becomes an integrate part of the moisture trap and replaces both the deep-cooler and the refrigerator in FIG. 1B.

The entire system is now substantially simplified. The said apparatus comprises only a pre-cooler 1a; a gas expander/compressor 23a/b; a gas-liquid separator 10; and an inhibitor regenerator 13.

The inlet moisture-laden NG is mixed with the inhibitor gas and enters the primary side of the pre-cooler section 1a via the NG inlet pipeline 2. The inlet NG flows downward and is pre-cooled with the cold dehydrated NG reflux flowing upward through the secondary side of the pre-cooler. As the temperature of the inlet NG drops along its flow path, the moisture condenses on the surface of the NG flow channels. The inhibitor gas dissolves into the condensate and forms a down-flowing liquid film on the surfaces. The inhibitor prevents the condensates from forming gas-hydrate and/or frozen into ice. The inhibitor solution is discharged as an effluent from the bottom of the pre-cooler via the inhibitor outlet pipeline 9. The pre-cooled NG exits from the pre-cooler via the dehydrated NG transfer pipeline 33, mixes with additional inhibitor gas introduced from the inhibitor bypass pipeline 18, and enters the NG expander 23a. After expansion, the NG is deep-cooled to the desired dewpoint temperature and enters the liquid-gas separator 10 via the depressurized NG transfer pipeline 24. The entrained liquid droplets are separated as an effluent discharged via the effluent transfer pipeline 12. The dehydrated NG, free from the entrained liquid, is recycled via the reflux transfer pipeline 3 as a reflux into the secondary side of the pre-cooler. The de-pressurized NG eventually exits from the pre-cooler via the de-pressurized NG outlet pipeline 28 and enters the compressor 23b. The NG is eventually re-compressed and delivered via the dehydrated NG outlet pipeline 29 to the transportation pipeline (not shown).

The effluent in the inhibitor transfer pipeline 9 joins the inhibitor solution in the inhibitor discharge pipeline 12. The joint solution enters the inhibitor regenerator 13, wherein the inhibitor gas is evaporated from the effluent and recycled. A portion of the regenerated inhibitor gas is recycled via the inhibitor recycle pipeline 14 and the regulating valve 19 to mix with the inlet NG stream coming from the NG inlet pipeline 2. The balance is recycled via the inhibitor bypass pipeline 18 and regulating valve 20 to the dehydrated NG transfer pipeline 33. The wastewater is discharged via the wastewater discharge pipeline 15. The makeup inhibitor gas is injected via the inhibitor makeup pipeline 16.

As described above, the system in FIG. 2B present a simplified apparatus wherein the deep-cooler and the refrigerator in FIG. 1B are replaced with a single NG expander-compressor.

FIG. 3 illustrates one preferred embodiment of the moisture trap of the present invention wherein an integrated multi-flow finned plate heat exchanger is used.

The moisture trap 35 is divided into two sections: the upper pre-cooler 35a and the lower deep-cooler 35b. The NG inlet pipeline 34 is connected to the top of the primary side of the pre-cooler, and the NG outlet pipeline 36 is connected to the bottom of the primary side of the deep-cooler. The reflux inlet pipeline 39 is connected to the secondary side of the bottom of the pre-cooler, and the reflux outlet pipeline 40 is connected to the top of the secondary side of the pre-cooler. The refrigerant inlet pipeline 41 is connected to the bottom of the secondary side of the deep-cooler, and the refrigerant outlet pipeline 42 is connected to the top of the secondary side of the deep-cooler. The inhibitor inlet pipeline 37 is connected to the top of the primary side of the pr-cooler, and the inhibitor (effluent) outlet pipeline 38 is connected to the bottom of the deep-cooler. The flow paths and flow directions of the respective fluids are shown with the dotted lines and arrows.

FIG. 4 illustrates the B—B cross-section of the moisture trap in FIG. 3.

The moisture trap is encased in a pressure vessel 46a. A multiplicity of partitions 46b divides the primary and the secondary side flow channels. The inlet NG flows from the top to the bottom of the moisture trap in the primary side flow channels 43. The reflux NG flows in the upper part of the secondary side flow channels 43, and the refrigerant flows in the lower part of the secondary side flow channels 45. Three sets of partition strips 46c are installed to prevent the mixing of different fluids: one set is fixed between the reflux NG and the refrigerant flow channels, and the other two sets at the upper and lower ends of the secondary flow channels as shown.

In FIG. 4, the inhibitor inlet pipeline 37 is connected to an inhibitor distributor 47. The reflux inlet ports 39a, the dehydrated NG outlet ports 39a, and the refrigerant inlet ports 41a are also seen in FIG. 4.

Figure 5:
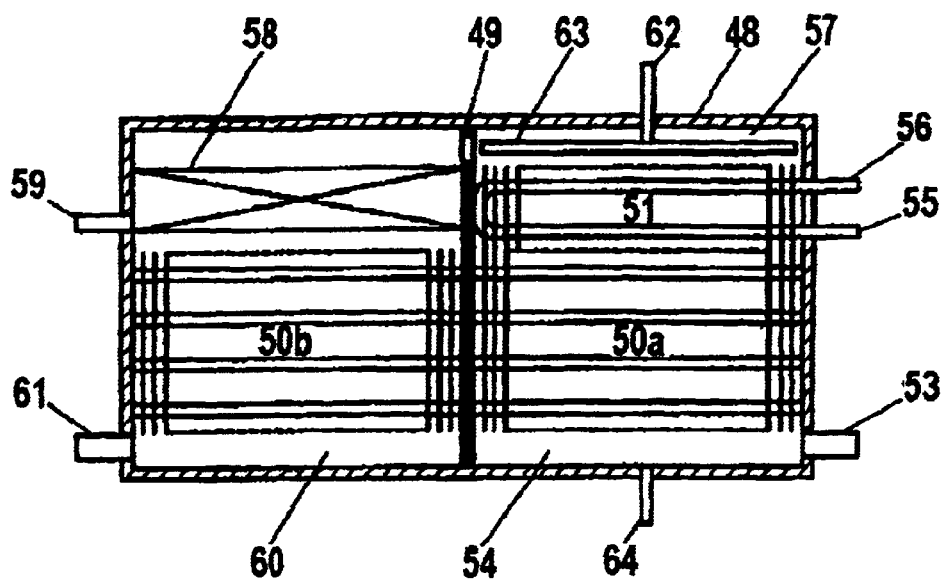
FIG. 5 illustrates another preferred embodiment of the moisture trap of the present invention wherein an integrated finned heat-pipe heat pre-cooler and a finned serpentine pipe deep-cooler are used.

FIG. 5 illustrates another preferred embodiment of the moisture trap of the present invention wherein an integrated finned heat-pipe heat pre-cooler and a finned serpentine pipe deep-cooler are used.

The moisture trap is installed in a single pressure vessel 38. A partition 49 divides the vessel into two chambers: the left chamber housing the hot-legs 50a of the heat-pipes and the right chamber housing the cold-legs 50b of the heat-pipes. The heat-pipe assembly 50a/b constitutes the pre-cooler of the moisture trap. A set of finned serpentine pipes 51, right above the hot-leg assembly 50a, constitutes the deep-cooler of the moisture trap.

The inlet moisture-laden NG enters the lower right plenum 54 of the moisture trap via the NG inlet pipeline 53 and flows upward across the hot-leg assembly 50a. The NG is pre-cooled and a portion of the moisture is condensed on the finned wall of the heat-pipes. The inlet NG continues flowing upward across the deep-cooling finned serpentine pipes 51 and is further cooled to the desired dewpoint. More moisture is condensed on the finned wall. An aqueous solution of inhibitor is distributed uniformly over the serpentine pipes via the inhibitor inlet pipeline 62 and the inhibitor distributor 63. A liquid film of inhibitor solution is formed and flows down over all the fin surfaces of the serpentine pipes and the hot-legs of the heat-pipes. The inhibitor solution film absorbs the condensates and prevents the formation of solid deposits. The diluted inhibitor solution is discharged via the inhibitor discharge pipeline 64.

The refrigerant (or brine) enters the serpentine pipes via the refrigerant inlet pipeline 55 and exits via the refrigerant outlet pipeline 56.

The deep-cooled NG flows through the opening 52 from the upper right plenum 57 into the liquid-gas separator 58, wherein the entrained liquid droplets are separated. The effluent is discharged via the effluent outlet pipeline 59. The cold dehydrated NG flows downward across the cold-leg of the heat-pipes 50b and absorbs heat from the hot-legs. The re-heated dehydrated NG eventually enters the lower left plenum 60 and exits from the moisture trap via the dehydrated NG outlet pipeline 61.

FIG. 6 illustrates the high-efficiency free-piston NG expander-compressor for providing self-refrigeration.

The light alloy body 65 of the said free piston expander-compressor comprises two cylinders with different diameters. The smaller cylinder 66 is the expander, and the larger 67 is the compressor. Two free pistons, 68 and 69, are rigidly connected with a short hollow shaft 70 to form a single integrated moving part. Since the latter is a simple, light-weighted component, very high frequency operation and high mechanical efficiency are feasible. For a high-pressure NG (usually over 6 MPA, as required in some gas transportation pipelines), the size of such a free piston machine is relatively small. For example, for an apparatus processing 500,000 $m^3$ STP per day, under an initial pressure of 10 MPA and an exit pressure of 5 MPA, the maximum diameter of the free piston expander-compressor would be around 12 cm while working at 4,000 strokes per minute.

In FIG. 6, the NG inlet pipelines 71 and 72 and the outlet pipelines 73 and 74 of the expander, as well as the inlet pipelines 75 and 76 and the outlet pipelines 77 and 78 of the compressor are illustrated. The associated valves controlling these inlet pipelines and outlet pipelines, similar to those used in modern high-speed internal combustion engine, are not shown.

In case that the pressure difference between the inlet NG and the outlet NG to the pipeline is so small that additional compressing energy is required, a viable option is to connect the said free piston by extending the shaft 79, as shown by the dotted line, to a conventional reciprocating piston-type gas engine not shown in FIG. 6.

In summary, the present invention provides a non-frost deep-freezing refrigeration dehydrator wherein no solid ice/gas-hydrate depositions appear even at very low dewpoint and, thus, continuous operations are feasible with a single dehydration unit. Alternative freezing-thawing operations are no longer required. The present invention also provides a low-cost dehydration apparatus that is universally applicable to both terrestrial and off-shore NG exploitation.

Having describes the present invention and preferable embodiments thereof, it will be recognized that numerous variations, substitutions and additions may be made to the present invention by those ordinary skills without departing from the spirit and scope of the appended claims.

What is claimed is:

1. A non-frost deep-freezing dehydrator comprising

A moisture trap connected to NG inlet and outlet pipelines and refrigerant inlet and outlet pipelines;

A liquid-gas separator connected to the moisture trap and an inhibitor regenerator;

A inhibitor regenerator connecting to an inhibitor recycle pipeline and a wastewater discharge pipeline; and A refrigeration unit connected to the moisture trap.

2. A non-frost deep-freezing dehydrator of claim 1 herein the moisture trap comprises a pre-cooling and a deep-cooling section.

3. A non-frost deep-freezing dehydrator of claim 1 wherein the top of the moisture trap is connected to an inhibitor inlet pipeline with a distributor that could introduce an aqueous solution of a gas-hydrate inhibitor to prevent the condensates from forming solid deposits.

4. A non-frost deep-freezing dehydrator of claim 1 wherein an inhibitor gas is introduced via two inhibitor introduction pipelines connected respectively to the NG inlet and the space between the pre-cooling and the deep-cooling sections.

5. A non-frost deep-freezing dehydrator of claim 1 wherein the inhibitor regenerator is eliminated and the inhibitor is used in a once-through cycle without recycling.

6. A non-frost deep-freezing dehydrator of claim 1 wherein the refrigeration unit comprising a separate industrial refrigerator.

7. A non-frost deep-freezing dehydrator of claim 1 wherein the refrigeration unit comprising a gas expansion device.

8. A non-frost deep-freezing dehydrator of claim 7 wherein the gas expansion device is an expansion valve.

9. A non-frost deep-freezing dehydrator of claim 7 wherein the gas expansion device is a turbo gas expander-compressor.

10. A non-frost deep-freezing dehydrator of claim 7 wherein the gas expansion device is a free-piston type gas expander-compressor comprising A gas expansion cylinder and a gas compression cylinder;

A co-shaft gas expansion piston and gas compression piston;

The gas inlet and outlet pipelines for each cylinder.

11. A non-frost deep-freezing dehydrator of claim 10 wherein the free-piston type expander-compressor comprises an extended shaft to be connected to an outside reciprocating power machine.

12. A non-frost deep-freezing dehydrator of claim 1 wherein a NG expansion device replaces both the deep-cooler and the refrigeration unit.

13. A non-frost deep-freezing dehydrator of claim 1 wherein the moisture trap comprises a specific type of heat exchanger with a multiplicity of long narrow flow channels.

14. A non-frost deep-freezing dehydrator of claim 1 wherein the moisture trip comprises a specific type of heat exchanger with a multiplicity of finned heat-pipes and finned serpentine pipes.

* * * * *